United States Patent [19]

Golinkin

[11] 4,137,182

[45] Jan. 30, 1979

[54] PROCESS FOR FRACTURING WELL FORMATIONS USING AQUEOUS GELS

[75] Inventor: Herbert S. Golinkin, Naperville, Ill.

[73] Assignee: Standard Oil Company (Indiana), Chicago, Ill.

[21] Appl. No.: 807,969

[22] Filed: Jun. 20, 1977

[51] Int. Cl.² .............................................. E21B 43/26
[52] U.S. Cl. .............................. 252/8.55 R; 166/283; 166/295; 166/308; 252/316
[58] Field of Search ..................... 252/8.55 R, 8.55 D, 252/316; 166/283, 308

[56] References Cited

U.S. PATENT DOCUMENTS

| | | | |
|---|---|---|---|
| 3,114,651 | 12/1963 | Gentile | 428/264 |
| 3,727,689 | 4/1973 | Clampitt | 166/283 |
| 3,816,151 | 6/1974 | Podlas | 252/8.55 X |
| 3,938,594 | 2/1976 | Rhudy et al. | 252/8.55 |
| 4,021,355 | 5/1977 | Holtmyer et al. | 252/8.55 |

*Primary Examiner*—Herbert B. Guynn
*Attorney, Agent, or Firm*—William C. Clarke; Arthur G. Gilkes; William T. McClain

[57] ABSTRACT

A method and composition for fracturing a subterranean formation which comprises (1) contacting a subterranean formation with an aqueous liquid comprising a propping agent and a composition containing water, acrylamide:methacrylate copolymer cross-linked with chromium (III) ion, in presence of carbonate ion, oxalate ion, and, optionally, persulfate ion, (2) applying pressure to said liquid, (3) maintaining said pressure to fracture said formation, (4) and said gel breaking within 24 hours of gel formation.

19 Claims, No Drawings

PROCESS FOR FRACTURING WELL FORMATIONS USING AQUEOUS GELS

BACKGROUND OF THE INVENTION

This invention relates to a process and composition for hydraulically fracturing subterranean formations having an injection means in fluid communication with the subterranean formation. Fracturing is accomplished with an aqueous fracturing fluid, with or without a propping agent suspended therein, which comprises a cross-linked polymeric gel that is syneresis-stable and temperature-stable to at least 250° F. This invention further relates to gelled hydraulic fracturing fluids prepared by a continuous process.

The use of polymer thickened fluids and gels is widespread, particularly in the oil industry where such fluids are used for plugging or fracturing operations in oil wells and in flooding for secondary recovery. In many cases, the thickened polymer needs to continue to serve in a thickened state. In others, after the thickened polymer has served its intended purpose, it is often desirable to remove it from the well or formation being treated. To this end, it is necessary to be able to decrease the viscosity of the fluid to a more pumpable state.

Desirable properties of a hydraulic fracturing fluid include high viscosity, low fluid loss, low friction loss during pumping into the well, stability under the conditions of temperature, use and contaminants found, such as in high temperature deep wells, and ease of removal from the fracture and well after the operation is complete.

The fluid loss properties of the fracturing fluid must be low enough to permit build-up and maintenance of the pressures necessary to fracture the formation. Otherwise, low penetration and/or ineffective fractures will be obtained.

Low friction loss is necessary to avoid excessive well head pressures in pumping the fracturing fluid through the casing and tubing and then into the formations. However, the use of high viscosity fracturing fluids is hampered usually due to excessive friction losses encountered during the injection of such fluids into a formation through tubing or casing in the well bore.

Stability under conditions of use, e.g., retention of sufficient viscosity at temperatures in the order of 200° F. and higher for a period of time sufficient to carry out the fracturing operation, is particularly important when the formations penetrated by deep high temperature wells are being fractured. Fracturing materials prepared from many of the prior art materials have no more viscosity than the viscosity of water at temperatures of 200° F. and higher.

Gel instability is evidenced by precipitation and/or syneresis (bleeding or medium separation). The phenomenon of syneresis occurs because the space available for solvent molecules, i.e., water or other medium, in the amorphous network of the gel decreases as the fraction increases of molecular chains that participate in forming crystalline regions within the gel. Accordingly, as the gel "sets", it also "settles" and a supernatant layer of fluid becomes visible over the gel phase. A test of gel stability accordingly is to prepare the gel and to allow it to stand at an increased temperature.

Techniques for hydraulically fracturing subterranean formations by injecting a fracturing fluid down a well and into a formation under sufficient pressure to create fractures in the formation are well known. Commonly, the fracturing fluid is pumped through the tubing or casing in the well bore into the formation to be fractured. The fracturing fluid is pumped at a rate sufficient to open a fracture in the exposed formation and to extend the fracture from the well bore into the formation. Continued pumping of the fracturing fluid containing a propping agent into said fracture results in proppant placement within the fractured zone. Following the treatment, the fracturing fluid is recovered from the well, leaving the proppant remaining in the fracture, thereby preventing the complete closure thereof and forming a permeable channel extending from the well bore into the formation.

The conductivity of the propped fracture depends among other factors on the size of the propping agent particles placed in the fracture. This in turn depends upon the width to which the particular fracture may be opened during injection of the fracturing fluid. The production of wide fractures typically requires that the fracturing fluids have high viscosities. The use of high viscosity fracturing fluids is advantageous since such fluids can support the propping agent particles suspended therein without excessive settling. Relatively large size propping agent particles can be placed in the formation using high viscosity fracturing fluids since wider fractures generally result, reducing the possibility of the propping agent bridging across the mouth of the fracture and accumulating in the well bore, causing what is known as a "sand-out" or a "screen-out."

Preparation of the fracturing fluid can be by a batch process or by a continuous process. In the batch process, the fluid is prepared and held in a holding tank until use which can mean added time and equipment expense, as well as added cost for fluid prepared but not used. In the continuous process the fracturing fluid is prepared at the well site and is discharged directly into the suction of the fracturing pumps. The continuous process is to be preferred usually since it permits more efficient use of fracturing fluid and surface equipment and reduces the need for holding tanks and other equipment. However, the continuous process requires the fracturing fluid be of the required high viscosity by the time the fluid reaches the bottom of the well bore and the fracture in the exposed formation. Accordingly, it is essential that the rate of gellation of the fracturing fluid be controlled to achieve the desired viscosity within a required time period. It is also essential that the increased viscosity be controllable, i.e., capable of being reduced so that after the fracturing fluid has fractured the formation and placed the propping agent in the fracture, the high viscosity is reduced so that the fracturing fluid can be speedily pumped from the fractured formation. The interconnecting pore spaces in the formation adjacent to the fracture are accordingly free from material which could restrict the flow of formation fluids into the fracture.

A variety of high viscosity fluids have been prepared for use in hydraulic fracturing operations. These fluids can be classified as oil-base or water-base fluids depending upon the composition of the continuous phase. The high-viscosity oil-base fluids, typified by gelled hydrocarbon liquids, viscous oils and water-in-oil emulsions are inherently temperature sensitive. Problems also exist in low permeability, tight formations and can require long clean-up periods when used to fracture these formations. The high viscosity water-base fluids include viscous gelled waters, gelled acids and oil-in-water emulsions. Viscous gelled water and gelled acids are based on water-soluble polymers. They possess good proppant suspension capabilities. However, use of such high viscosity water based fracturing fluids is hampered because many of these viscous gelled waters are temperature sensitive—they lose viscosity at higher temperatures which not only reduces the pressure generated in the fracture but also increases the rate at which the fluid leaks off into the formation matrix. Oil-in-water emulsions are difficult to handle and exhibit high friction losses in the well conduit. Furthermore, since pumping equipment and tubular goods available at the wellhead are often limited, the wellhead pressure and hydraulic horsepower required to overcome such friction losses are often prohibitive. That is, a high viscosity fluid often cannot be injected into a formation at a high rate due to excessive friction losses in the well tubing or casing. Such friction losses would require more pump capacity and stronger tubular goods than are normally used.

As gellation rate determines rate of viscosity increase, thus causing the high friction losses encountered during pumping, many attempts have been made to control gellation rate. Dilution techniques as to concentration of polymer and gelling agents have been used. Hydrated fracturing gels have been developed which are pH sensitive and accordingly gel within a predetermined pH range. Methods have been developed to use an already gelled fluid by lubricating the fracturing fluid down the wellbore on a layer of a less viscous fluid which is injected into the well tubing along with the fracturing fluid. All of these methods require either information as to downhole conditions or use of sophisticated injection equipment or pumping equipment and tubular goods not normally available at a wellhead.

I have now devised a composition for fracturing wells which comprises an aqueous liquid of water and an acrylamide-methacrylate copolymer, a cross-linking agent of chromium (III) ion, an activating agent of carbonate ion, a gel stabilizer of an oxalate ion and a breaker of a persulfate ion. Propping agents can be included in the composition. Gellation rate is controlled to cause the gelled fluid to reach a usefully high viscosity at the time it reaches the formation to be fractured, usually approximately five minutes. Friction losses during pumping are accordingly minimized. The influences of conditions within the borehole such as the pH level and temperature are reduced.

I also provide a method of fracturing a subterranean formation penetrated by a wellbore which comprises injecting a composition according to the invention through the wellbore.

SUMMARY OF THE INVENTION

A method and composition for fracturing well formations which comprises (1) contacting a subterranean formation with an aqueous liquid comprising a propping agent and a composition containing water, acrylamide:methacrylate copolymer cross-linked with chromium (III) ion, in the presence of carbonate ion, oxalate ion and, optionally persulfate ion, (2) applying pressure to said liquid, (3) maintaining said pressure to fracture said formation (4) and said gel breaking within 24 hours of gel formation.

DESCRIPTION OF THE PRIOR ART

Patents representative of the prior art on gelled fluids include the following:

U.S. Pat. No. 3,397,744 to Hort et al.: Compositions of catalytically cross-linked polyvinyl pyrrolidone polymers and sand grains are pumped into a wellbore, the gellation time of the composition being controlled by redox catalyst systems and system dilution.

British Pat. No. 1,337,651 to Holtmyer: A polysaccharide in water and a cross-linking agent form a composition for fracturing well formations, the rate of the cross-linking reaction being dependent upon the pH of the fracturing gel.

U.S. Pat. No. 3,554,287 to Eilers et al.: A gelable composition of a water-soluble metal salt, water, and a water-dispersible synthetic polymer wherein the amount of metal salt determines gel time at a given temperature.

U.S. Pat. No. 3,727,688 to Clampitt: A gel of desired viscosity is obtained by adding to water a water-soluble cellulose ether, a water-soluble compound of a polyvalent metal capable of being reduced to a lower valence state and a water soluble reducing agent. Time of gellation can be controlled by dilution of the gel. pH over 7 can retard gellation rate.

U.S. Pat. No. 3,727,689 to Clampitt: Aqueous gels of polyacrylamides, water-soluble compounds of a polyvalent metal and a water-soluble reducing agent. Time of gellation can be controlled by dilution of the gel. pH over 7 can retard gellation rate.

U.S. Pat. No. 3,749,172 to Hessart et al.: Aqueous gels prepared from strong brines, certain polyacrylamides and certain polyvalent metals and reducing agents. Dilution and pH can control rate of gellation.

U.S. Pat. No. 3,768,566 to Ely et al.: A fracturing fluid comprising an aqueous fluid having a pH less than 7, a water soluble alcohol and a cross-linked polysaccharide. Gellation rate is controlled by pH.

U.S. Pat. No. 3,816,151 to Podlas: Self-destructing aqueous gels are prepared by adding to an aqueous solution of an anionic polymer such as a copolymer of acrylamide and an anionic vinyl unsaturated comonomer and carboxymethylcellulose, a trivalent chromium salt, and an oxidizer such as a persulfate.

U.S. Pat. No. 3,839,255 to Podlas: Process for gelling a solution of an anionic acrylamide copolymer using a chelated aluminum salt. By selection of chelate and adjustment of pH gellation is controlled.

U.S. Pat. No. 3,888,312 to Tiner: Solvatable polysaccharide in presence of titanium (IV) as cross-linking agent. Rate of cross-linking at normal temperature is function of the pH of base gel.

U.S. Pat. No. 3,897,827 to Felber: Lignosulfonate solution with a water-soluble dichromate and an alkali metal salt forms gels. Gellation time depends upon temperature and dichromate/salt concentration.

There are several methods by which gelled polymer fracturing fluids can be caused to break down with time so that their final viscosity approximates that for ungelled polymer solution, or water. One method is to use excessive amounts of the gelling agent which will cause breakdown of the gel but which is uneconomic. Another method is to expose the gel to elevated temperatures but in many instances the gel is formulated to withstand high temperatures. Another method is to use "gel breakers" such as a perborate or persulfate.

The use of "breakers" to reduce the viscosity of certain selected viscous water soluble organic polymeric aqueous solutions is not new. In U.S. Pat. No. 2,483,936 the viscosity of an aqueous solution of guar gum is reduced by dispersing in the solution sodium and hydrogen peroxide. In U.S. Pat. No. 3,024,191 the viscosity of an aqueous solution of carboxymethylcellulose is reduced with a perborate. In U.S. Pat. No. 3,442,803 a water-soluble specific polymer of acrylamide and methylenebisacrylamide is broken by adding a water soluble persulfate or perborate thereto. In these patents, a specific breaker was found to be effective on a specific water soluble organic polymer viscosity increasing agent.

Accordingly, it is known in the prior art to gel acrylamide polymers in a media by cross-linking them with trivalent chromium. It is also known that the rate of gellation can be controlled by certain salt concentrations, by temperature and by pH level as well as by dilution techniques. The prior art also teaches the preparation and use of aqueous gel compositions using synthetic polymers which can be self-destructing by the inclusion of a breaker in the composition formula. However, the need clearly exists for a stable aqueous gel for use in hydraulic fracturing of subterranean formations wherein the gel can be prepared by a continuous process, is able to overcome the problems associated with high friction loss during pumping due to high viscosity, yet is able to support propping agent particles so as to place the proppants in the fractured formation and then is able to break cleanly within a specified time period. The desirable properties of an aqueous gel for use in hydraulic fracturing by a continuous process are that (1) the fluid reach a usefully high viscosity within five minutes after addition of a cross-linking agent, (2) retain its viscosity and stability for four to eight hours at reservoir temperatures, (3) support propping agents and (4) break cleanly, within 24 hours. It is important that the fluid reach a usefully high viscosity within 5 minutes as it takes 3 to 5 minutes for the fluid to reach the bottom of the well. It is not desirable economically that the fluid go any further into the well. It is desired that the fracturing occur in the desired placement without causing sandouts or screenouts. If the well has been drilled for secondary recovery purposes, control of the gellation time aids control of formation fingering with consequent loss of fluids.

DETAILED DESCRIPTION OF THE INVENTION

Process and composition for hydraulically fracturing subterranean formations using an acrylamide:methacrylate copolymer cross-linked with chromium (III) ion in water, in presence of carbonate ion as an activating agent and in presence of oxalate ion as a gel stabilizer to form a fracturing gel stable against syneresis, contaminants and reservoir temperatures. Time of gel formation is about five minutes. In presence of persulfate ion as a breaker, gel can break cleanly within 24 hours to permit pump-out from the bore-hole after use for hydraulic fracturing. The unbroken gel can be used for fluid control such as water-shutoff, cementing and injection control in oil-well and similar applications.

The amount of copolymer used is sufficient to increase viscosity of the aqueous fluid as a gel to a certain initial amount. For purposes of this invention the term "acrylamide:methacrylate copolymer" is defined as a high molecular weight water-soluble polymeric salt of ammonia, sodium or potassium, of a molecular weight range of greater than 1,000,000 consisting essentially of from about 50 to about 90, preferably from about 60 to 70, weight percent acrylamide and from about 10 to about 50, preferably from about 30 to about 40, weight percent methacrylate as the sodium salt. The most preferred copolymer consists essentially of about 65 weight percent acrylamide and about 35 weight percent sodium methacrylate. The defined acrylamide/sodium methacrylate copolymers are further characterized as having a molecular weight sufficient to provide a brine viscosity of at least 1.8 centipoises (measured in Cannon viscometer) when dissolved in a concentration of about 500 ppm in an aqueous brine containing from about 3650 to about 3750 ppm sodium chloride and from about 365 to about 375 ppm calcium chloride made with deionized water. The copolymers can be produced by any known method of conducting polymerization reactions provided substantially no cross-linking or formation of water-insoluble polymer occurs. Solution, suspension or emulsion techniques can be used. The physical form of the copolymer is not critical but it is used in accordance with conventional practices known in the art.

A preferred water-soluble trivalent chromium salt is chrome alum, chromium potassium sulfate, $KCr(SO_4)_2 \cdot 12H_2O$. Substantially any water soluble chromium salt can be used including chromium acetate, chromium chloride and chromium sulfate. The concentration of the chromium ion can vary so long as enough chromium (III) ion is present to react with the ionic polymer. At a constant polymer concentration of 0.4% (wgt) of total gel weight including aqueous component, the chromium ion concentration would be that found in a range of addition of chrome alum of 0.12% to 1.1% (wgt) of total gel weight and 26 to 110% (wgt) of polymer weight.

Carbonate ion can be incorporated into the aqueous gel as an aqueous solution of any carbonate compound in which the carbonate ion appears as $-CO_3$ or $-HCO_3$, and in which the cation of the carbonate compound does not exhibit a detrimental effect upon the aqueous gel. Suitable carbonate salts include sodium carbonate, sodium bicarbonate, potassium carbonate, potassium bicarbonate, ammonium carbonate, and ammonium bicarbonate. The preferred carbonate salts are sodium carbonate and sodium bicarbonate. The carbonate ion is present in an amount sufficient to actuate rapid formation of said gel upon addition of said chromium salt to the copolymer. The carbonate ion can be present in the aqueous gel in concentrations of that found in a range of addition of sodium carbonate of 0.003 to 0.2% (wgt) of total gel weight including media or water content or 0.3 to 50% (wgt) of the polymer weight.

Oxalate ion can be incorporated into the aqueous gel composition as an aqueous solution of any water-soluble oxalate salt in which the cation of the oxalate compound does not exhibit a detrimental effect upon the aqueous gel. Suitable oxalate salts include sodium oxalate, $Na_2C_2O_4$, potassium oxalate, $K_2C_2O_4$, and ammonium oxalate, $(NH_4)_2C_2O_4$. The oxalate ion is present in an amount sufficient to stabilize said gel against syneresis upon standing and heating. The oxalate can be present in the aqueous gel in concentrations found in a range of addition of sodium oxalate of 0.01 to 0.03% (wgt) of total gel weight including media or water content or 1.0 to 7.5% (wgt) of polymer weight.

Any water soluble perborate or persulfate can be used and in which the cation of the perborate or persulfate compound does not exhibit a detrimental effect upon the aqueous gel. A preferred source of persulfate ion is ammonium persulfate $(NH_4)_2S_2O_8$, but suitable water soluble persulfate salts include sodium persulfate, $Na_2S_2O_8$, and potassium persulfate, $K_2S_2O_8$. The concentration of persulfate ion expressed as ammonium persulfate is within the range of from 0.0005 to 0.2%

(wgt) of total gel weight including media or water content.

Propping agents which can be used in the practice of the invention include any of those known in the art, e.g., sand grains, walnut shell fragments, tempered glass beads, aluminum pellets, nylon pellets or any mixture of two or more thereof, and similar materials. Such agents can be used in concentrations of about 0.1 to 10 pounds per U.S. gallon of fracturing fluid. In general, propping agents with particle sizes of 6 mesh to about 400 mesh, more preferably 8 to about 100, and most preferably 20 to 60 mesh are employed. The term "propping agent" is understood to include "spacing agents" which can be dissolved in place rather than removed from the fracture.

In preparing these aqueous gels for oilfield use, it is of course desirable for economic and ease of operation to use water available on site. Frequently, these waters, produced from wells in the field, contain large amounts of dissolved solids which in many cases have a high content of sodium chloride, calcium chloride and other components of field brines. Because of the salt content, it has not always been possible to use field brines for gels, or when gels are obtained, obtain gels of the required stability. In order to be assured of success, it has often been necessary to use fresh water, at least water containing a relatively small amount of total dissolved solids. The present invention provides a solution to this problem.

Another advantage in using field produced brines in preparing aqueous gels as described herein is that the problem of disposing of such brines is lessened.

Gel instability is evidenced by precipitation and/or syneresis (bleeding or water separation). I have found that gels prepared in the method of the invention demonstrate temperature stability at temperatures to 250° F. and are stable at such temperatures for as long as 4 hours without evidence of syneresis.

Herein and in the Claims, unless otherwise specified, the aqueous gels used in practice of my invention are defined for convenience, and not by way of limitation, in terms of the amount of the total gel weight including the water content.

In preparation of the gel it has been found that polymer concentration or content of a 65:35 acrylamide:-sodium methacrylate copolymer can be within the range of from 0.4 to 1.0% (wgt) of the total gel weight. A higher polymer content can be used but such use is uneconomic. The chrome alum concentration or content can be within the range of 0.12 to 1.1% (wgt) of the total gel weight, based on a 65:35 polymer content of 0.4 to 1.0% (wgt) of total gel weight. The weight ratio of chrome alum content to polymer content therefore can be within the range of 26 to 110% (wgt) but preferred range of chrome alum to polymer is 53 to 100% by weight. At a constant polymer concentration or content of 0.4% (wgt) of total gel weight, the chrome alum concentration or content can be within the range of 0.12% to 0.43% by weight of the total gel weight. It has been found that chrome alum content of 0.20–0.23% (wgt) was the approximate optimum level for stable cross-linking of a gel with 0.4% polymer by weight of the entire gel (1:1 equivalent ratio by weight of chrome alum to polymer or one-third mole chrome alum per 1 mole of polymer carboxylate). Concentrations greater than 0.43% (wgt) of chrome alum in a 0.4% (wgt) polymer gel resulted in fast gelation but syneresis of the gel occurred within 5 to 10 minutes. Comparable equivalent ratios of gel constituents are necessarily required with polymers of formulation such as 60:40, 50:50, 35:65, etc., acrylamide:sodium methacrylate polymers.

In summary, the invention consists of a method and composition for fracturing of subterranean formations with an aqueous liquid containing a polymeric composition of acrylamide:sodium methacrylate copolymer cross-linked with chromium (III) ion in the presence of carbonate ion as an activating agent and oxalate ion as a gel stabilizer wherein the polymer concentration (content) is within the range of 0.4 to 1.0% (wgt) of the total gel weight including aqueous component. The chrome alum concentration (content) is within the range of 0.12 to 1.1% (wgt) of the total gel weight and the weight ratio of chrome alum concentration to polymer concentration is within the range of 0.26 to 1.1. Preferred range of chrome alum to polymer is 0.50 to 0.55 by weight for 65:35 acrylamide:sodium methacrylate copolymer. The concentration (content) of carbonate ion as sodium carbonate is in the range of from 0.003 to 0.2% of total gel weight or 0.3 to 50% (wgt) of polymer weight. The concentration (content) of oxalate ion as sodium oxalate is within the range of 0.01 to 0.03% of total gel weight or 1.0 to 7.5% (wgt) of polymer weight. If persulfate ion is used as a breaker, the concentration (content) of persulfate ion expressed as ammonium persulfate is within the range of from 0.0005 to 0.2% (wgt) of total gel weight. The method of fracturing a subterranean formation comprises the steps of (1) contacting the subterranean formation with an aqueous liquid of the above composition, (2) applying sufficient pressure to fracture said formation, (3) maintaining said pressure while injecting said aqueous liquid into said fracture, (4) and said formed gel breaking within 24 hours of gel formation. Approximately the same method can be used for fluid control such as to control water in subterraneous formations, to consolidate sand in incompetent formations and other typical uses by formulating the aqueous gel without the breaker component.

The following procedure was followed in each of the examples.

To prepare the copolymer:brine solution, 1.5 grams of the 65:35 acrylamide:sodium methacrylate copolymer was added to 297 grams (297 ml) of 0.5 N to 1.0 N sodium chloride solution. The pH can be adjusted to any desired level by adding an appropriate amount of NaOH. Appropriate amounts of sodium carbonate and sodium oxalate were added separately with stirring to the above solution using a paddle type stirrer. While stirring at a rate sufficient to create a deep vortex chrome alum was added to the vortex with a hypodermic syringe. Time to gel was measured with a stop watch. As the last of the chrome alum was added, the stopwatch was started. The mixture was transferred to a Fann Viscometer Model 35, after 15 seconds of stirring. The Fann Viscometer had the R3-B1-F0.2 rotor-bob-spring configuration and operated at 100 rpm. Under these conditions the maximum scale deflection of 300° corresponds to a viscosity of 8.04 poise and the shear rate is 37.7 sec.$^{-1}$. The breaker solution, when added, was added simultaneously with, or successively to, the chrome alum solution.

Fluid loss characteristics were measured using the procedure defined in API Bulletin RP39, first edition, July 1960, reissued September 1966. A "Specially Hardened Filter Paper For Baroid Filter Processes" Catalog No. 988, with a diameter of 2½ inches, marketed by Baroid Division, National Lead Company, Houston, Tex. was used as the filter paper.

The preparation of the above-described gels is illustrated by the following examples, which are given by way of illustration and are not intended to limit the scope of the invention.

EXAMPLE I

The following example shows the slow gelling rate when sodium carbonate or sodium bicarbonate is not used.

A quantity of 1.5 grams of 65:35 acrylamide:sodium methacrylate copolymer was stirred into 297 grams (297 ml) of 1.0 N sodium chloride brine to make 0.5% (wgt) copolymer solution. This solution had a pH of 5.5–6.0. 4.0 ml of 20% (wgt) chrome alum solution containing 0.8 grams of chrome alum were added. Weight ratio of chrome alum weight to copolymer weight was 0.53. Weight ratio of chrome alum weight to total gel weight was 0.0026. Weight ratio of copolymer weight to total gel weight was 0.0050. The Fann viscosity was determined.

| Time (Minutes) | Viscosity In Poise |
|---|---|
| 1 | 0.67 |
| 2 | 0.59 |
| 3 | 0.56 |
| 4 | 0.58 |
| 5 | 1.4 |
| 6 | 3.6 |
| 7 | 3.5 |
| 8 | 3.9 |
| 9 | 4.2 |
| 10 | 4.4 |

EXAMPLE II

The procedure of Example I was repeated except that prior to addition of the chrome alum, 0.079g $Na_2CO_3$, 0.026% of total gel weight, was added and the pH determined to be 8.5. After addition of the chrome alum solution, the Fann viscosity reached 8.04 p in 50 seconds.

EXAMPLE III

The procedure of Example II was repeated using 0.061g $NaHCO_3$, 0.020% of total gel weight, in place of the $Na_2CO_3$. The initial pH was 5.5–6.0. The Fann viscosity reached 8.04p in 51 seconds.

EXAMPLES IV–VIII

The following examples show the result of increasing the amount of $Na_2CO_3$ beyond a maximum amount which in turn slowed the gellation rate. The amount of sodium carbonate is critical to the gellation rate as is evidenced in Examples IV through VIII. It is unknown whether the critical composition lies in the overall concentration of the carbonate ion or in the ratio of the carbonate ion to the chromium ion or polymer content.

A 1.0 N NaCl brine solution, 297 g, containing 0.4% (wgt) copolymer of the final total gel weight was treated with amounts of $Na_2CO_3$ ranging from 0.0033% (wgt) to 0.17% (wgt) of total gel weight. Then 0.64 grams of chrome alum in 3.2 ml of a 20% chrome alum solution, 0.21% (wgt) of total gel weight, were added. Viscosities determined with a Fann viscometer. The results are shown in the following table.

Table 1

| | Gellation Rates - $Na_2CO_3$ Content As % (Wgt) of Total Gel Weight | | | | |
|---|---|---|---|---|---|
| Example No. | IV | V | VI | VII | VIII |
| Copolymer | | | | | |
| Wgt. g | 1.2 | 1.2 | 1.2 | 1.2 | 1.2 |
| % Gel Wgt | 0.4 | 0.4 | 0.4 | 0.4 | 0.4 |
| $Na_2CO_3$ | | | | | |
| Wgt. g | 0.01 | 0.03 | 0.10 | 0.30 | 0.50 |
| % Gel Wgt | 0.0033 | 0.010 | 0.033 | 0.10 | 0.17 |
| pH Before Chrome Alum | 6.0–6.4 | 6.8 | 8.5–9.0 | — | 10.5 |
| Chrome Alum | | | | | |
| Wgt, g | 0.64 | 0.64 | 0.64 | 0.64 | 0.64 |
| % Gel Wgt | 0.21 | 0.21 | 0.21 | 0.21 | 0.21 |
| Gel Viscosity-In Poise In Minutes | | | | | |
| 1 | 0.38 | 0.42 | 5.9 | 1.3 | 0.59 |
| 2 | 0.36 | 3.8 | 8.04 | 8.04 | 0.58 |
| 3 | 0.42 | 8.04 | | | 0.55 |
| 4 | 3.8 | | | | 0.52 |
| 5 | 4.4 | | | | 0.52 |
| 6 | 4.0 | | | | 0.51 |
| 7 | 5.4 | | | | 0.50 |
| 8 | 5.5 | | | | 0.50 |
| 9 | 5.0 | | | | 0.50 |
| 10 | 4.8 | | | | 0.48 |

EXAMPLES IX–XIII

The following examples illustrate the lack of influence of pH level on gel rate. Weight ratios of oxalate:-chromium (III) ions were held constant in all examples except in Examples IX and X. The pH level is not a factor in slowing gel rate unless above 12.0.

Quantities of 295 to 300 ml of 0.4% (wgt) copolymer of total gel weight in 1.0 N NaCl solutions containing various amounts of sodium carbonate and sodium oxalate, the pH's of which were adjusted with appropriate amounts of 50% NaOH, were treated with 3.2 ml 20% chrome alum. The results are shown in the following table.

Table II

| | Gellation Rates and pH Levels | | | | |
|---|---|---|---|---|---|
| Example No. | IX | X | XI | XII | XIII |
| Copolymer | | | | | |
| Wgt. g | 1.2 | 1.2 | 1.2 | 1.2 | 1.2 |
| % Gel Wgt | 0.4 | 0.4 | 0.4 | 0.4 | 0.4 |
| $Na_2CO_3$ | | | | | |
| Wgt g. | 0.05 | 0.05 | 0.05 | 0.05 | 0.05 |
| % Gel Wgt | 0.017 | 0.017 | 0.017 | 0.017 | 0.017 |
| $Na_2C_2O_4$ | | | | | |
| Wgt, g | — | — | 0.072 | 0.072 | 0.072 |
| % Gel Wgt | — | — | 0.024 | 0.024 | 0.024 |
| pH Before Chrome Alum | 7.6 | 11.0 | 7.0 | 11.5 | 12.0–12.5 |
| Chrome Alum | | | | | |
| Wgt. g | 0.64 | 0.64 | 0.64 | 0.64 | 0.64 |
| % Gel Wgt | 0.21 | 0.21 | 0.21 | 0.21 | 0.21 |
| Gel Rate - Sec. to 8.04p | 93 | 98 | 96 | 102 | (a) |

(a) After 10 minutes, viscosity was 5.4 poise.

These examples were heated at 110° F. overnight. Examples IX through XII showed various degrees of syneresis. Example XIII showed no syneresis and had a viscosity greater than 8.04 poise.

EXAMPLES XIV–XIX

The following examples show the effect of varying amounts of $Na_2CO_3$ and $Na_2C_2O_4$ with a relatively constant pH level. A controlling synergism appears to be present between varying levels of $Na_2CO_3$ and $Na_2C_2O_4$. Syneresis, upon standing and heating, was exhibited by samples without $Na_2C_2O_4$.

A 1.0 N NaCl brine solution, 297 g, containing 0.4% (wgt) copolymer of final total weight was treated with varying amounts of $Na_2CO_3$ and $Na_2C_2O_4$. The pH was adjusted with 50% NaOH. The solution was treated with 3.2 ml 20% chrome alum, then placed in an oven at 156° F. overnight. The following table illustrates the results.

Table III

| | Gellation Rates - $Na_2CO_3$ and $Na_2C_2O_4$ Contents as % (Wgt) of Total Gel Weight | | | | | |
|---|---|---|---|---|---|---|
| Example No. | XIV | XV | XVI | XVII | XVIII | XIX |
| Copolymer | | | | | | |
| Wgt. g | 1.2 | 1.2 | 1.2 | 1.2 | 1.2 | 1.2 |
| % Gel Wgt | 0.4 | 0.4 | 0.4 | 0.4 | 0.4 | 0.4 |
| $Na_2CO_3$ | | | | | | |
| Wgt. g | 0.05 | 0.05 | — | — | 0.05 | 0.05 |
| % Gel Wgt | 0.017 | 0.017 | — | — | 0.017 | 0.017 |
| $Na_2C_2O_4$ | | | | | | |
| Wgt. g | — | — | 0.036 | 0.072 | 0.036 | 0.072 |
| % Gel Wgt | — | — | 0.012 | 0.024 | 0.012 | 0.024 |
| pH Before Chrome Alum | 9.89 | 11.46 | 11.75 | 11.74 | 11.75 | 11.80 |
| Chrome Alum | | | | | | |
| Wgt. g | 0.64 | 0.64 | 0.64 | 0.64 | 0.64 | 0.64 |
| % Gel Wgt | 0.21 | 0.21 | 0.21 | 0.21 | 0.21 | 0.21 |
| Gel Viscosity in Poise Minutes | | | | | | |
| 1 | 0.60 | 0.64 | 0.60 | 0.60 | 0.60 | 0.74 |
| 2 | 8.04 | 8.04 | 0.59 | 0.56 | 1.6 | 1.3 |
| 3 | | | 0.58 | 0.54 | 5.6 | 5.1 |
| 4 | | | 0.59 | 0.56 | 8.04 | 5.6 |
| 5 | | | 0.86 | 0.80 | | 5.6 |
| 6 | | | 1.6 | 1.5 | | 6.0 |
| 7 | | | 2.4 | 2.0 | | 6.4 |
| 8 | | | 2.7 | 2.7 | | 6.8 |
| 9 | | | 3.1 | 2.8 | | 8.04 |
| 10 | | | 3.0 | 3.1 | | — |
| Minutes:Seconds to 8.04 Poise | 1:20 | 1:41 | — | — | 3:42 | 8:34 |

Examples XIV and XV exhibited syneresis after heating to 156° F. overnight. The others showed no syneresis and maintained viscosities above 8.04 poise.

EXAMPLE XX

The following example illustrates the slow increase in viscosity of a gel comprising copolymer solution in the presence of sodium oxalate in brine with chrome alum and ammonium persulfate but without the presence of sodium carbonate.

Into 296 ml of a 1.0 N NaCl brine solution containing 0.4% (wgt) of 65:35 copolymer of total gel weight and 0.012% (wgt) sodium oxalate (0.036 grams) of total gel weight having a pH of 11.43, there was stirred 0.21% (wgt) chrome alum of total gel weight (3.2 ml of 20% chrome alum solution) and 0.01% (wgt) ammonium persulfate of total gel weight (1.0 ml 30% ammonium persulfate solution). The following table shows the increase in viscosity with time.

| Time | Viscosity in Poise |
|---|---|
| 1 | 0.44 |
| 2 | 0.42 |
| 3 | 1.4 |
| 4 | 1.2 |
| 5 | 2.9 |
| 6 | 3.2 |
| 7 | 3.1 |
| 8 | 3.6 |
| 9 | 4.3 |
| 10 | 4.2 |

The solution was heated at 156° F. overnight after which the gel was completely broken. A minor amount of residue was present.

EXAMPLE XXI

The procedure of Example XX was repeated using $Na_2CO_3$ as a gel rate enhancer.

A 297 ml of 1.0 N NaCl brine solution was stirred which contained 0.4% (wgt) 65:35 copolymer, 0.012% (wgt) sodium oxalate and 0.017% (wgt) sodium carbonate of total gel weight. The pH was adjusted to 11.44 with NaOH. To the solution, 0.21% (wgt) chrome alum, 0.64 g. in 3.2 ml 20% solution, and 0.1% (wgt) ammonium persulfate, 0.3 g in 1.0 ml 30% solution, were added. After 60 seconds the viscosity was 0.67 poise and 8.04 poise after 81 seconds. The sample was placed in an oven and heated at 156° F. overnight after which the gel was completely broken and no solid residue was evident.

EXAMPLES XXII-XXVII

The procedure of Example XXI was repeated using varying amounts of ammonium persulfate as a gel breaker. The gel breaker content had little effect upon residue after gel breaking.

A 297 ml solution of 1.0 N NaCl brine was stirred which contained 0.4% (wgt) 65:35 copolymer, 0.012% (wgt) sodium oxalate and 0.017% (wgt) sodium carbonate of total gel weight. The pH was adjusted with NaOH. To the solution, 0.21% (wgt) chrome alum, 0.64 g in 3.2 ml 20% solution, and the amounts of ammonium persulfate shown in the following table were added. Results were as follows:

Table IV

| | Gellation Rates- Ammonium Persulfate Content as % (Wgt) of Total Gel Weight | | | | | |
|---|---|---|---|---|---|---|
| Example No. | XXII | XXIII | XXIV | XXV | XXVI | XXVII |
| Copolymer | | | | | | |
| Wgt., g | 1.2 | 1.2 | 1.2 | 1.2 | 1.2 | 1.2 |
| % Gel Wgt | 0.4 | 0.4 | 0.4 | 0.4 | 0.4 | 0.4 |

Table IV-continued

| | Gellation Rates- Ammonium Persulfate Content as % (Wgt) of Total Gel Weight | | | | | |
|---|---|---|---|---|---|---|
| Example No. | XXII | XXIII | XXIV | XXV | XXVI | XXVII |
| $Na_2CO_3$ | | | | | | |
| Wgt, g | 0.05 | 0.05 | 0.05 | 0.05 | 0.05 | 0.05 |
| % Gel Wgt | 0.017 | 0.017 | 0.017 | 0.017 | 0.017 | 0.017 |
| $Na_3C_2O_4$ | | | | | | |
| Wgt, g | 0.036 | 0.036 | 0.036 | 0.036 | 0.036 | 0.036 |
| % Gel Wgt | 0.012 | 0.012 | 0.012 | 0.012 | 0.012 | 0.012 |
| pH Before Chrome Alum | 11.18 | 11.30 | 11.36 | 11.26 | 11.28 | 11.36 |
| Chrome Alum | | | | | | |
| Wgt. g | 0.64 | 0.64 | 0.64 | 0.64 | 0.64 | 0.64 |
| % Gel Wgt | 0.21 | 0.21 | 0.21 | 0.21 | 0.21 | 0.21 |
| $(NH_4)_2S_2O_8$ | | | | | | |
| Wgt, g | 0.3 | 0.15 | 0.06 | 0.03 | 0.015 | 0.008 |
| % Gel Wgt | 0.1 | 0.05 | 0.02 | 0.01 | 0.005 | 0.001 |
| Final pH | 5.62 | 5.80 | 5.90 | 6.00 | 5.95 | 5.97 |
| Viscosity (Poise) | | | | | | |
| In 60 Sec. | 0.45 | 0.91 | 0.56 | | | |
| (Sec. to 8.04 Poise) | (98) | (84) | (102) | | | |
| 1 Hr. at 156° F | 1.6 | 8.0 | 3.5 | | | |
| 4 Hrs at 156° F | | | | 1.6 | 8.0 | 8.0 |

The samples were placed into an oven at 156° F. The viscosities were read after 1 hour, 4 hours and 24 hours. After 24 hours all six gels were completely broken. Example XXII had a significant quantity of residue and Example XXVII had a small amount of residue. The other examples had no residue. The residue in Example XXII may have been due to incomplete mixing.

EXAMPLES XXVIII-XXX

The procedure in Examples XXII-XXVII was repeated in Examples XXVIII-XXX to determine effect upon gel stability of chrome alum in the presence of ammonium persulfate as a gel breaker. Examples XXVIII-XXX indicate that the combination of chrome alum and breaker controls viscosity at increased temperatures at periods less than 24 hours at lower levels of addition of chrome alum.

A 297 ml of a 1.0 N NaCl brine solution was stirred which contained 0.4% (wgt) 65:35 copolymer, 0.017% (wgt) sodium carbonate, and 0.012% (wgt) sodium oxalate of total gel weight. The pH was adjusted with NaOH. To the solution, chrome alum in 20% chrome alum solution and ammonium persulfate in 3% solution were added. Results were as shown in the following table.

Table V

| | Gel Stability In Presence Of Chrome Alum and Ammonium Persulfate | | |
|---|---|---|---|
| Example No. | XXVIII | XXIX | XXX |
| Copolymer | | | |
| Wgt. g | 1.2 | 1.2 | 1.2 |
| % Gel Wgt | 0.4 | 0.4 | 0.4 |
| $Na_2CO_3$ | | | |
| Wgt, g | 0.05 | 0.05 | 0.05 |
| % Gel Wgt | 0.017 | 0.017 | 0.017 |
| $Na_2C_2O_4$ | | | |
| Wgt. g | 0.036 | 0.036 | 0.036 |
| % Gel Wgt | 0.012 | 0.012 | 0.012 |
| pH Before Chrome Alum | 11.24 | 11.23 | 11.30 |
| Chrome Alum | | | |
| Wgt, g | 0.32 | 0.32 | 0.32 |
| % Gel Wgt | 0.11 | 0.11 | 0.11 |
| $(NH_4)_2S_2O_8$ | | | |
| Wgt, g | 0.0 | 0.03 | 0.003 |
| % Gel Wgt | 0.0 | 0.01 | 0.001 |
| Final pH | 6.62 | 6.98 | 6.70 |
| Viscosity (Poise) | | | |
| 4 Hrs at 156° F | 8.0 | 0.3 | 4.8 |

After 24 hours at 156° F., Examples XXIX and XXX were completely broken and had no solid residue. Example XXVIII had a viscosity of 5.4 poise and showed no evidence of syneresis.

EXAMPLE XXXI

Fluid loss characteristics of a formulation of
0.71% (Wgt) Polymer
0.17% (Wgt) Chrome Alum
0.012% (Wgt) Sodium Oxalate
0.017% (Wgt) Sodium Carbonate
of total gel weight were determined according to the procedure of API Bulletin RP39, as discussed earlier. The first four runs were replicate runs to establish reproducibility of the method. The spurt loss ($V_{SP}$) of the first run was large but the square root time slope and subsequent fluid loss coefficient ($C_{III}$) showed good agreement among the four runs. No significant difference was found in fluid loss properties in brines of low salinity or high salinity or containing potassium chloride (KCl) at 250° F. The instant invented process is accordingly useful for high-temperature oil reserves. The data are shown in Table VI.

Table VI

| | Gel Fluid Loss Characteristics | | | |
|---|---|---|---|---|
| Brine | Temperature | $V_{sp}$ | $\sqrt{}$Time Slope | $C_{III}$ |
| 1.0 N NaCl | 123° F | 3.42 ml | 2.29 ml./min$^{\frac{1}{2}}$ | 0.00167 ft/min$^{\frac{1}{2}}$ |
| 1.0 N NaCl | 124° F | −0.76 | 2.20 | 0.00160 |
| 1.0 N NaCl | 123° F | −0.85 | 2.21 | 0.00161 |
| 1.0 N NaCl | 124° F | −0.77 | 2.25 | 0.00164 |
| 11500 ppm NaCl | 124° F | −0.31 | 1.98 | 0.00144 |
| 1150 ppm NaCl | 123° F | −0.78 | 2.50 | 0.00181 |
| 2% KCl | 122° F | −0.64 | 2.05 | 0.00149 |
| 2% KCl | 250° F | 7.8 | 3.85 | 0.00279 |

Table VI-continued

| | Gel Fluid Loss Characteristics | | | |
|---|---|---|---|---|
| Brine | Temperature | $V_{sp}$ | $\sqrt{\text{Time}}$ Slope | $C_{III}$ |
| 0.05 N NaCl | 120° F. | 4.0 | 3.04 | 0.00220 |

The typical $C_{III}$ factors for water-base fluids are: minimum 0.001, field average 0.002, maximum 0.0090 (G. C. Howard et al, *Hydraulic Fracturing*, Am. Soc. Pet. Engrs., p 36 (1970)).

EXAMPLE XXXII

The procedure of Example I was repeated in attempts to gel a copolymer solution with ions of aluminum (III), titanium (IV), titanium (III), ferrous (II), zirconium (IV), and cesium (IV). The viscosity data were determined on a Brookfield viscometer. Formulations of three gels included gel breakers. For comparison, a copolymer formulation with chrome alum was also repeated. The gels with ions of aluminum (III), titanium (IV), titanium (III), iron (II), zirconium (IV) and cesium (IV) all failed, were soft or showed no evidence of cross-linking in comparison with gels of chromium (III). The data are presented in Table VII.

Table VII

Gellation Rates - Summary Data
Multivalent Metal Ions

| Metal Ion | % (Wgt) Total Gel Wgt Metal Ion | % (Wgt) Total Gel Wgt Copolymer | % (Wgt) Ratio Metal: Copolymer | Gellation Minutes | CPS (RPM) |
|---|---|---|---|---|---|
| Aluminum (III) | 0.028 | 0.96 | 2.9 | 7 | 60900 LVT4 at 6 RPM |
| Aluminum (III) | 0.0054 | 0.99 | 0.55 | 10 | 28750 LVT4 at 12 RPM |
| Titanium (IV) | 0.039 | 1.0 | 3.9 | 10 | 6200 LVT4 at 12 RPM |
| Titanium (III) | 0.052 | 1.0 | 5.2 | 10 | 470 LVT4 at 40 RPM |
| Iron (II) | 0.060 | 1.0 | 6.0 | 10 | 720 LVT4 at 60 RPM |
| Zirconium (IV) | 0.050 | 1.0 | 5.0 | 10 | 510 LVT4 at 60 RPM |
| Cesium (IV) | 0.11 | 1.0 | 11.0 | 10 | 3560 LVT4 at 60 RPM |
| Chromium (III) | 0.056 | 1.0 | 5.6 | 10 | 818,000 LVT4 at 1.5 RPM |
| Chromium (III) | 0.056 | 1.0 | 5.6 | 10 | 71,000 LVT4 at 6 RPM |
| Chromium (III) | 0.010 | 1.0 | 1.0 | 10 | 142,000 LVT4 at 3 RPM |

EXAMPLE XXXIV

A fracturing fluid consisting of 0.71% (wgt) copolymer aqueous solution with 0.017% (wgt) $Na_2CO_3$, 0.012% (wgt) $Na_2C_2O_4$ and 0.005% (wgt) ammonium persulfate is prepared using 1.5 pounds of $Na_2CO_3$, 1.0 pounds of $Na_2C_2O_4$ and 0.43 pounds of ammonium persulfate per 1000 gallons of 1.0 NNaCl brine solution containing 62 pounds of copolymer. The fracturing fluid is continuously mixed by a circulation pump. The fluid is pumped with a metering pump into an inline mixer at the rate of 0.15 bbls per minute simultaneously with 0.0013 bbls per minute of a 20% (wgt) chrome alum solution, which is also pumped with a metering pump, and 9.5 pounds/minute of 40–60 mesh Ottawa washed sand. The sand acts as a proppant to maintain the open fracture after the gel breaks. The fluid is fed into the high pressure fracturing pump. The resulting stabilized aqueous gel is injected into a 25 foot section sandstone formation in Crawford County, Illinois, USA through an injection well at 900 psig surface pressure to fracture the surrounding formation rock. The fracture treatment provides improved fluid injectivity. The aqueous gel breaks within 24 hours of gel formation and the fluid is pumped out from the bore-hole.

What is claimed is:

1. An aqueous fluid composition comprising water, a soluble polymer selected from the group consisting of the polymeric salts of ammonia, sodium and potassium salts of acrylamide: methacrylate copolymer, said copolymer having a weight ratio of from about 50 to about 90 weight percent acrylamide and from about 10 to about 50 weight percent methacrylate, and said copolymer having a molecular weight sufficient to provide a brine viscosity of at least 1.8 centipoises (measured in Cannon viscometer) when dissolved in a concentration of about 500 ppm in an aqueous brine containing from about 3650 to 3750 ppm sodium chloride and from about 365 to 375 ppm calcium chloride made with deionized water, a chromium ion of a watersoluble trivalent chromium salt in an amount sufficient to cross-link said acrylamide: methacrylate copolymer, said copolymer in an amount sufficient to increase viscosity of said fluid as a gel to a certain initial amount, a carbonate ion in an amount sufficient to actuate rapid formation of said gel upon addition of said chromium salt to said copolymer, an oxalate ion of a water-soluble oxalate salt in an amount sufficient to stabilize said gel against syneresis upon standing and heating.

2. The composition of claim 1 wherein the said polymer is acrylamide:sodium methacrylate copolymer in a concentration within the range of from 0.4 to 1.0% (wgt) of total aqueous fluid weight.

3. The composition of claim 2 wherein the said acrylamide:sodium methacrylate copolymer is about 65% (wgt) acrylamide and 35% (wgt) sodium methacrylate.

4. The composition of claim 1 wherein the said chromium ion is of a trivalent chromium salt selected from the group consisting of chrome alum, chromium acetate, chromium chloride and chromium sulfate.

5. The composition of claim 4 wherein the said chromium salt is chrome alum, the concentration of said chromium ion as chrome alum being in the range of 0.12% (wgt) to 1.1% (wgt) of total aqueous fluid weight, and 26% (wgt) to 110% (wgt) of said copolymer weight wherein said copolymer is acrylamide:sodium methacrylate copolymer of 65% (wgt) acrylamide and 35% (wgt) sodium methacrylate.

6. The composition of claim 1 wherein said carbonate ion as a carbonate salt is selected from the group consisting of sodium carbonate, sodium bicarbonate, potassium carbonate, potassium bicarbonate, ammonium carbonate and ammonium bicarbonate.

7. The composition of claim 6 wherein said carbonate is sodium carbonate, the concentration of said carbonate ion as sodium carbonate being the range of from 0.003% (wgt) to 0.2% (wgt) of total aqueous fluid weight.

8. The composition of claim 1 wherein the said oxalate ion is of an oxalate salt selected from the group consisting of sodium oxalate, potassium oxalate and ammonium oxalate.

9. The composition of claim 8 wherein the said oxalate salt is sodium oxalate and concentration of oxalate ion as sodium oxalate is within the range of from 0.01% (wgt) to 0.03% (wgt) of total aqueous fluid weight.

10. The composition of claim 1 wherein said composition comprises a persulfate ion in an amount sufficient to break the viscosity of the fluid to a value below the initial viscosity.

11. The composition of claim 10 wherein the persulfate ion is of a persulfate salt selected from the group consisting of sodium persulfate, potassium persulfate and ammonium persulfate.

12. The composition of claim 11 wherein the said persulfate salt is ammonium persulfate and concentration of persulfate ion as ammonium persulfate is within the range of from about 0.0005% (wgt) to 0.2% (wgt) of total aqueous fluid weight.

13. The composition of claim 1 wherein the said aqueous fluid comprises a particulate solid propping material selected from the group consisting of sand grains, walnut shell fragments, tempered glass beads, aluminum pellets, nylon pellets or any mixture of two or more thereof.

14. The composition of claim 13 wherein the concentration of said propping material is from 0.1 pounds to 10 pounds per U.S. gallon of said aqueous fluid.

15. A method of fracturing a subterranean formation comprising the steps of:
(1) contacting the subterranean formation with an aqueous fluid composition comprising water, a soluble polymer selected from the group consisting of the polymeric salts of ammonia, sodium and potassium salts of acrylamide: methacrylate copolymer, said copolymer, having a weight ratio of from about 50 to 90 weight percent acrylamide and from about 10 to about 50 weight percent methacrylate, and said copolymer having a molecular weight sufficient to provide a brine viscosity of at least 1.8 centipoises (measured in Cannon viscometer) when dissolved in a concentration of about 500 ppm in an aqueous brine containing from about 3650 to 3750 ppm sodium chloride and from about 365 to 375 ppm calcium chloride made with deionized water, a chromium ion of a water-soluble trivalent chromium salt in an amount sufficient to cross-link said polymer, said copolymer in an amount sufficient to increase viscosity of said fluid as a gel to a certain initial amount, a carbonate ion in an amount sufficient to actuate rapid formation of said gel upon addition of said chromium salt to said copolymer, an oxalate ion of a water-soluble oxalate salt in an amount sufficient to stabilize said gel against syneresis upon standing and heating,
(2) applying sufficient pressure to said composition to fracture said formation,
(3) maintaining said pressure while injecting said composition into said fractured formation.

16. The method of claim 15 wherein said composition comprises a persulfate ion in an amount sufficient to break the viscosity of the fluid to a value below the initial viscosity.

17. The method of claim 16 wherein said formed gel breaks.

18. The method of claim 15 wherein said composition comprises a particulate solid propping material selected from the group consisting of sand grains, walnut shell fragments, tempered glass beads, aluminum pellets, nylon pellets or any mixture of two or more thereof.

19. The method of claim 18 wherein concentration of said propping material is from 0.1 pounds to 10 pounds per U.S. gallon of said composition.

* * * * *